United States Patent
Shen et al.

(10) Patent No.: US 10,867,416 B2
(45) Date of Patent: Dec. 15, 2020

(54) HARMONIZING COMPOSITE IMAGES USING DEEP LEARNING

(71) Applicant: ADOBE INC., San Jose, CA (US)

(72) Inventors: Xiaohui Shen, San Jose, CA (US); Zhe Lin, Fremont, CA (US); Yi-Hsuan Tsai, Merced, CA (US); Xin Lu, Mountain View, CA (US); Kalyan K. Sunkavalli, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/456,367

(22) Filed: Mar. 10, 2017

(65) Prior Publication Data

US 2018/0260668 A1    Sep. 13, 2018

(51) Int. Cl.
*G06T 11/00* (2006.01)

(52) U.S. Cl.
CPC .... *G06T 11/00* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 5,745,668 A * | 4/1998 | Poggio | G06T 9/001 345/475 |
| 2005/0129305 A1 * | 6/2005 | Chen | G06K 9/20 382/154 |
| 2017/0244908 A1 * | 8/2017 | Flack | G06K 9/00234 |
| 2018/0068463 A1 * | 3/2018 | Risser | G06T 7/45 |
| 2018/0144244 A1 * | 5/2018 | Masoud | G06F 19/321 |
| 2018/0204336 A1 * | 7/2018 | Fang | G06T 11/001 |

OTHER PUBLICATIONS

Lee, J. Y., Sunkavalli, K., Lin, Z., Shen, X., & So Kweon, I. (2016). Automatic content-aware color and tone stylization. In Proceedings of the IEEE Conference on Computer Vision and Pattern Recognition (pp. 2470-2478).

Sunkavalli, K., Johnson, M. K., Matusik, W., & Pfister, H. (Jul. 2010). Multi-scale image harmonization. In ACM Transactions on Graphics (TOG) (vol. 29, No. 4, p. 125). ACM.

Tsai, Y. H., Shen, X., Lin, Z., Sunkavalli, K., & Yang, M. H. (2016). Sky is not the limit: semantic-aware sky replacement. ACM Trans. Graph., 35(4), 149-1.

(Continued)

*Primary Examiner* — Justin P. Misleh
(74) *Attorney, Agent, or Firm* — Shook, Hardy & Bacon L.L.P.

(57) ABSTRACT

Methods and systems are provided for generating harmonized images for input composite images. A neural network system can be trained, where the training includes training a neural network that generates harmonized images for input composite images. This training is performed based on a comparison of a training harmonized image and a reference image, where the reference image is modified to generate a training input composite image used to generate the training harmonized image. In addition, a mask of a region can be input to limit the area of the input image that is to be modified. Such a trained neural network system can be used to input a composite image and mask pair for which the trained system will output a harmonized image.

15 Claims, 8 Drawing Sheets

(56) References Cited

OTHER PUBLICATIONS

Xue, S., Agarwala, A., Dorsey, J., & Rushmeier, H. (2012). Understanding and improving the realism of image composites. ACM Transactions on Graphics (TOG), 31(4), 84.

Zhu, J. Y., Krahenbuhl, P., Shechtman, E., & Efros, A. A. (2015). Learning a discriminative model for the perception of realism in composite images. In Proceedings of the IEEE International Conference on Computer Vision (pp. 3943-3951).

* cited by examiner

HARMONIZING COMPOSITE IMAGES USING DEEP LEARNING

BACKGROUND

Oftentimes, users desire to extract foreground regions from an image to combine with a different background image to create a composite image. In many cases, the color and/or tone of the foreground region are not compatible with the new background region. As such, to make the composite image more realistic and uniform in composition, the color and/or tone requires adjustment, or to be made uniform. This process is known as image harmonization. Currently, image harmonization approaches largely rely on trying to match colors. For example, color compatibility/realism methods try to match color and/or tone of the foreground region to the colors and/or tone of the background region. As another example, example-based color transfer methods take color (s) from a reference image and transfer the color scheme of the reference image to the composite image. However, these methods oftentimes can produce unrealistic results, especially when the foreground region and the background region are greatly different or a proper exemplar image for color transfer cannot be found. As such, current methods fail to consistently and accurately harmonize composite images.

SUMMARY

Embodiments of the present invention are directed towards a system trained to generate harmonized composite images, where a harmonized composite image reflects accurate coloration and/or tone between the foreground region and the background region. In accordance with embodiments of the present invention, such a system can be created using neural networks. In this regard, neural networks can be trained to assist in generating a harmonized composite image. The accuracy of a harmonized composite image generated by a neural network system depends upon how the system is trained and what data it receives when training to produce harmonized composite images. To create a neural network system that generates accurate harmonized composite images, the system can be trained to learn accurate coloration and/or tone between foreground objects/regions and the background region of a composite image. Such a system can be comprised of one or multiple neural networks.

Training can be accomplished by generating a training dataset of synthesized composite images by altering the coloration and/or tone of objects or regions in images. Such alterations can be performed using, for example, a mask to segment a desired region; this region can then be altered and composited with the original background to synthesize a composite image. These training image/mask pairs can be used to train a system to learn accurate coloration and/or tone between foreground and background regions to generate accurate harmonized composite images. During training, errors are determined and used to adjust the system to avoid similar errors in future iterations. Upon completion of training, such a system can be used to harmonize composite images by matching coloration and/or tone to either the color/tone of the foreground region or the color/tone of the background image.

DETAILED DESCRIPTION

Figure 1:
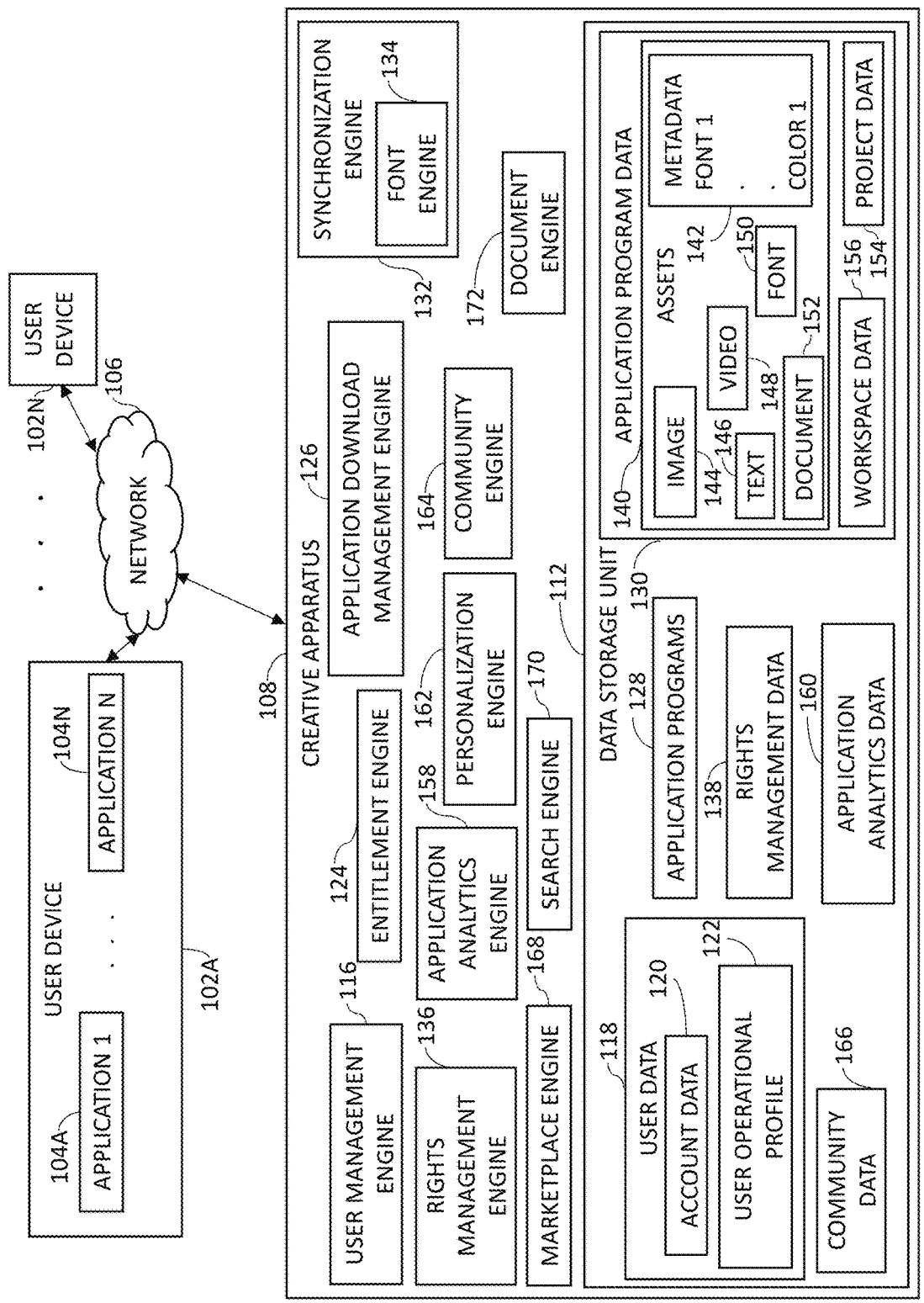
FIG. 1 depicts a diagram of an environment in which one or more embodiments of the present disclosure can be practiced, in accordance with various embodiments of the present disclosure.

Various embodiments of the present invention are directed towards a trained neural network system for generating harmonized composite images, where a harmonized composite image reflects accurate coloration and/or tone between foreground region(s) and background region. To create such a neural network system, the system can be trained to learn accurate coloration and/or tone between foreground objects/regions and a background region of a composite image. Accurate coloration and/or tone training can be accomplished using a training dataset of synthesized composite images. A synthesized composite image can be generated by altering the coloration and/or tone of an object or region of an image and then compositing the altered object or region with the unaltered background of the image. Such a training dataset can then be input to train the system to learn accurate coloration and/or tone between foreground and background regions when generating harmonized composite images.

The need for image harmonization arises when a user attempts to create a composite image by extracting foreground regions and combining them with new background images and/or regions. For example, a composite image can be generated by altering the background behind a person in an image from a cityscape to a tropical beach. Upon compositing a foreground region with a new background region, oftentimes, the coloration and/or tone between the foreground and background of the composite image are not consistent. Harmonizing the appearance of the foreground region(s) and/or background region(s) can result in more a realistic and accurate composite image.

Harmonized composite images using existing approaches, however, are oftentimes unsatisfactory to users, as the resulting images can often be unrealistic. Such conventional approaches to image harmonization of composite images heavily rely on matching colors to harmonize the two or more different images that make up a composite image and the results can often be disappointing to users. Statistics matching methods involve using a reference image to alter the foreground and background regions to have the same color and/or tone. Such methods can result in unrealistic harmonized composite images because the methods directly match color and/or tone between foreground and background regions without considering the realism of the overall harmonized composite image. This matching of color and/or tone can provide unrealistic results because the color and/or tone being used to harmonize the foreground with the background region may change the foreground region to an unrealistic color and/or tone during harmonization. For example, in an image with a white horse as the foreground region and a forest with yellow wildflowers as the background region, a yellow tone can end up being assigned to the white horse resulting in a composite image of a yellow horse in a field of yellow wildflowers. Additionally, example-based methods can use external images to transfer an overall appearance to a composite image. However, it can be difficult to find proper exemplars, and when improper exemplars are used, the harmonized composite image fails to appear realistic. For example, when an exemplar of a sunset with wispy clouds over a city is used for a composited image of a sky with wispy clouds over a city in the day, transferring the appearance of the exemplar results in an overall composite image that fails to maintain coloration of daylight. To attempt to incorporate realism into harmonization, a realism score of a composite image can be used to adjust the foreground region. Such a method can be performed using a learned model that estimates if a composite image is realistic. However, such methods use simple parametric models that cannot recognize realism for complex composited images. Thus, such methods cannot adequately handle many cases with complex scenes and foreground appearances.

Accordingly, embodiments of the present invention are directed to facilitating efficient and effective harmonization of composite images. In this regard, a composite image provided by a user can be harmonized to reflect unified coloration and/or tones between the foreground and background regions of the composite image while maintaining its realism and accuracy in its overall color scheme. A foreground region of an image refers to the portion(s) of the image that are nearest to the observer, and/or are the focal point, or main subject, in the image. The portion(s) of the foreground region can be comprised of different objects, for example, people, a mountain, or an animal. As such, in the context of the foreground region, a foreground region can refer to the object(s) the make up the foreground of an image. A background region refers to the portion(s) of an image that depict the scene behind the main subject in the image, or the scene behind the foreground region and/or foreground objects in the image. As such, in the context of the background region, a background region refers to the areas of an image that do not comprise the foreground region. An image portrays a representation of a scene and/or objects and can include, for example, a picture.

At a high-level, realistic, harmonized composite images can be generated by a neural network system. A neural network is a computational approach loosely based on how the brain solves problems using large clusters of connected neurons. Neural networks are self learning and trained so that a generated output reflects a desired result. As described herein, a neural network system, such as an image harmonizing neural network system, can be trained using at least one neural network. In such a system, a neural network, for example, an image harmonizing neural network, can be trained to generate harmonized composite images from an input composite image and a mask of the foreground region of the composite image. Although generally described as one neural network, any number of neural networks can be trained in accordance with embodiments described herein.

Training a neural network system requires a training dataset. A large number and variety of images is often helpful in creating a system capable of handling a wide array of subject matters. However, it is difficult to create an adequate training dataset to accomplish such robust training because image harmonization often requires an expert in photography generate high quality and accurate harmonized images by editing composite images. As such, the time and cost associated with creating a large enough dataset for training a neural network is not feasible. Accordingly, instead of creating training data by harmonizing composite images, training data can be generated by creating composite images from real images, where the real images are treated as the desired output (perfectly harmonized images) for training purposes. As such, composite images can be generated for adequately training an image harmonizing neural network system so that the system is not only able to be trained to perform end-to-end learning for image harmonization but learns to effectively utilize context and semantic information about an input image as part of the harmonization process.

Generally, to train an image harmonizing neural network system, a neural network, for example, an image harmonizing neural network, can be trained based on harmonized composite images generated for input composite images. In particular, the image harmonizing neural network can output a training harmonized image based on a training input composite image and a foreground region mask for the composite image. Thereafter, the training harmonized image can be compared with a reference image, known as a ground-truth image, to determine errors between the training harmonized image and the reference image. In embodiments, the reference image is the image modified to generate the training input composite image. Such errors are then fed back through the image harmonizing neural network to appropriately train the neural network, for instance, by adjusting the weight of the network connections to reduce the value of the errors. This process can be repeated for a sufficiently large number of training cycles, until the neural network system converges to a state where the error of the calculations is small enough such that the output harmonized images reach a desired threshold level of similarity to the reference images.

Training a neural network system to generate a harmonized image for an input composite image, as described herein, ensures realistic coloration and/or tone of the harmonized composite image. To this end, during the training process, the neural network system learns to take into account differences between a harmonized image generated from an input composite image and a reference image reflecting ground-truth coloration and/or tone for the harmonized image. The neural network also learns to recognize and utilize context and semantic information of an input composite image during harmonization. Such training ensures that the neural network system recognizes not only color and/or tone differences between foreground and background regions of images but also recognizes semantic information related to the various regions of an image to learn appropriate colors to assign; for example, that grass is yellow/green and sky is blue.

Turning to FIG. 1, FIG. 1 is a diagram of an environment 100 in which one or more embodiments of the present disclosure can be practiced. The environment 100 includes one or more user devices, such as a user devices 102A-102N. Examples of the user devices include, but are not limited to, a personal computer (PC), tablet computer, a desktop computer, a processing unit, any combination of these devices, or any other suitable device having one or more processors. Each user device can include at least one application supported by the creative apparatus 108. It is to be appreciated that following description may generally refer to the user device 102A as an example and any other user device can be used.

A user of the user device can utilize various products, applications, or services supported by the creative apparatus 108 via the network 106. The user devices 102A-102N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manages digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 102A-102N can be connected to a creative apparatus 108 via a network 106. Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user can create an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

In some embodiment, the user management engine 116 and the entitlement engine 124 can be one single engine performing the functionalities of both the engines.

The user can then install various applications supported by the creative apparatus 108 via an application download management engine 126. Application installers or application programs 128 present in the data storage unit 112 are fetched by the application download management engine 126 and made available to the user directly or via the application manager. In one embodiment, an indication of all application programs 128 are fetched and provided to the user via an interface of the application manager. In another embodiment, an indication of application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 104A-104N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 130 in the data storage unit 112 by a synchronization engine 132. Alternatively or additionally, such data can be stored at the user device, such as user device 102A.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiment.

A user can operate one or more user devices to access data. In this regard, the application program data 130 is accessible by a user from any device, including a device which was not used to create the assets 140. This is achieved by the synchronization engine 132 that stores the application program data 130 in the data storage unit 112 and enables the application program data 130 to be available for access by the user or other users via any device. Before accessing the application program data 130 by the user from any other device or by any other user, the user or the other user may need to provide login details for authentication if not already logged in. In some cases, if the user or the other user are logged in, then a newly created asset or updates to the application program data 130 are provided in real time. The rights management engine 136 is also called to determine whether the newly created asset or the updates can be provided to the other user or not. The workspace data 156 enables the synchronization engine 132 to provide a same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. Such synchronization generally happens in real time. Similarly, synchronization of any type of the application program data 130 can be performed.

In some embodiments, user interaction with the applications 104 is tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the applications 104 that enables the application to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and options are provided to the user for publishing using the digital publishing application or any other application. In addition, while preparing the article, a recommendation can also be made by the synchronization engine 132 to incorporate some of other assets saved by the user and relevant for the article. Such a recommendation can be generated using one or more engines, as described herein.

The creative apparatus 108 also includes a community engine 164 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, a plurality of users are assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

Figure 2:
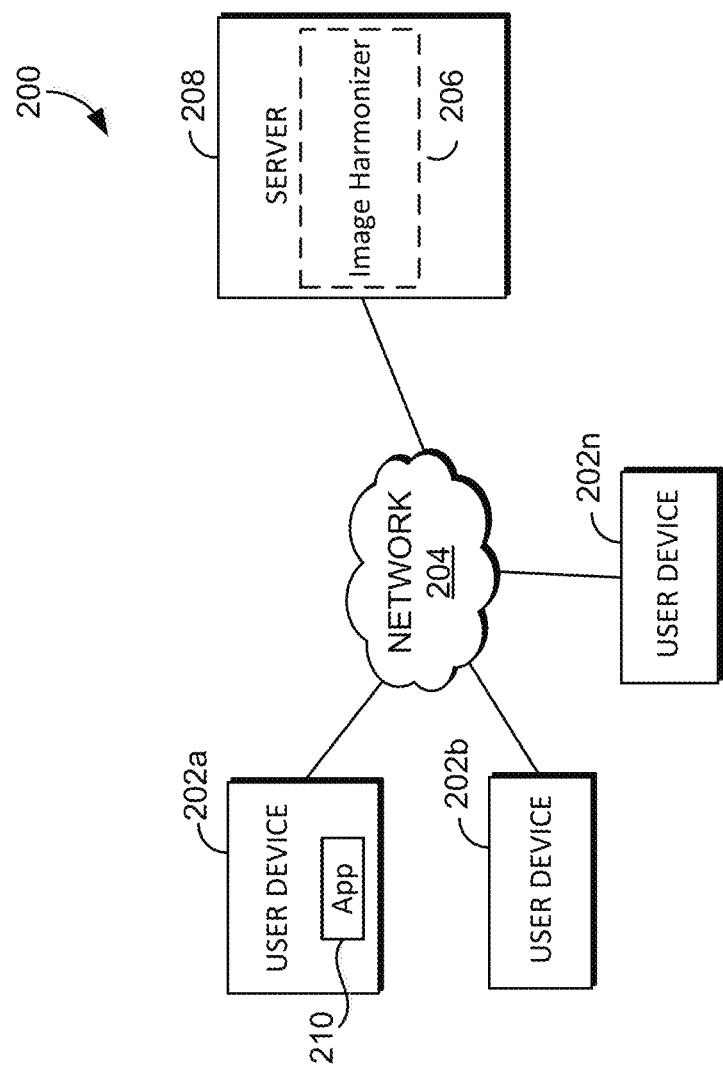
FIG. 2 depicts an example configuration of an operating environment in which some implementations of the present disclosure can be employed, in accordance with various embodiments of the present disclosure.

In accordance with embodiments of the present invention, application programs 128 can include an application, such as application 210 of FIG. 2, which facilitates generating harmonized images for input composite images. Such an application can be provided to the user device 102A so that the image harmonizing application operates via the user device. In another embodiment, such an image harmonizer can be provided as an add-on or plug-in to an application, such as a design or image processing application.

FIG. 2 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 200 shown in FIG. 2 is an example of one suitable operating environment. Among other components not shown, operating environment 200 includes a number of user devices, such as user devices 202a and 202b through 202n, network 204, and server(s) 208. Each of the components shown in FIG. 2 may be implemented via any type of computing device, such as one or more of computing device 900 described in connection to FIG. 9, for example. These components may communicate with each other via network 204, which may be wired, wireless, or both. Network 204 can include multiple networks, or a network of networks, but is shown in simple form so as not to obscure aspects of the present disclosure. By way of example, network 204 can include one or more wide area networks (WANs), one or more local area networks (LANs), one or more public networks such as the Internet, and/or one or more private networks. Where network 204 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 204 is not described in significant detail.

It should be understood that any number of user devices, servers, and other components may be employed within operating environment 200 within the scope of the present disclosure. Each may comprise a single device or multiple devices cooperating in a distributed environment.

User devices 202a through 202n can be any type of computing device capable of being operated by a user. For example, in some implementations, user devices 202a through 202n are the type of computing device described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 210 shown in FIG. 2. Application 210 is referred to as a single application for simplicity, but its functionality can be embodied by one or more applications in practice. As indicated above, the other user devices can include one or more applications similar to application 210.

The application(s) may generally be any application capable of facilitating the exchange of information between the user devices and the server(s) 208 in carrying out harmonizing an input composite image. In some implementations, the application(s) comprises a web application, which can run in a web browser, and could be hosted at least partially on the server-side of environment 200. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 210 can facilitate generating a harmonized image from an input composite image. In particular, a user can select or input a composite image or picture to harmonize. For example, a user may select a desired composite image from a repository, for example, stored in a data store accessible by a network or stored locally at the user device 202a. Alternatively, a user can select or input an image or picture from which a region is to be extracted and composited with a selected or inputted image or picture as a new background. For example, a user may take a picture using a camera on a device, for example, user device 202a, to use as either the background or from which to extract the foreground region.

Based on the input composite image, a harmonized image can be generated and provided to the user via the user device 202a. In this regard, the harmonized image can be displayed via a display screen of the user device. In addition, a user can select, for example, whether to harmonize the input composite image to the coloration and/or tone of the foreground region or the coloration and/or tone of the background region.

As described herein, server 208 can facilitate harmonizing composite images via image harmonizer 206. Server 208 includes one or more processors, and one or more computer-readable media. The computer-readable media includes computer-readable instructions executable by the one or more processors. The instructions may optionally implement one or more components of image harmonizer 206, described in additional detail below.

Image harmonizer 206 can train and operate a neural network system in order to harmonize composite images. Such a neural network system can be comprised of one or more neural networks trained to generate designated output. For example, a neural network system can include a neural network, such as an image harmonizing neural network, that generates harmonized images for input composite images.

At a high level, image harmonizer 206 trains a neural network system, for example, a neural network system including an image harmonizing neural network. To train such an image harmonizing neural network, the image harmonizing neural network can generate harmonized images based on input images. An input image generally refers to one or more images provided to the neural network system, or portion thereof. Such an input image can be a composite image generated by altering a foreground region of an image to have a different coloration and/or tone from the background region of the image. Input composite images used to train the image harmonizing neural network may be referred to herein as training images or training input images Input composite images input into a trained image harmonizing neural network system can include two images that are composited and then input into the image harmonizing neural network.

An input image can also be a mask input into the neural network system along with such a composite image. A mask generally refers to an image depicting in greyscale what pixels are foreground and what pixels are background. In a binary mask, foreground pixels of an image can be displayed using white and background pixels can be displayed using black. It should be appreciated that a mask can also be used that includes degrees of greyscale for pixels that include both foreground and background information. In embodiments, the input mask can be for the foreground region of the input composite image. In other embodiments, the input mask can be inverted and applied as a mask of the background region of the input composite image. Allowing for masks of either the foreground or background regions allows a user to select what portion of the composite image is used for coloration and/or tone during harmonization.

Harmonized images generated in accordance with training the image harmonizing neural network may be referred to herein as training harmonizing images. The generated harmonized images can be compared to a reference image to facilitate training of the image harmonizing neural network. In this regard, the image harmonizing neural network can be modified or adjusted based on the comparison such that the quality of subsequently generated harmonized images increases. Such training helps to maintain realism of the colors used when adjusting the foreground region(s) to match the background region, or vice versa, during the harmonization process. As used herein, a reference image refers to the unedited image prior to any alteration to synthesize a training composite image. Such a reference image is used as a standard, or ground-truth, for evaluating the quality of a harmonized image generated from a training composite image by the image harmonizing neural network. These ground-truth images can be referred to as reference images and/or reference harmonized images.

In various implementations, a neural network system, comprised of an image harmonizing neural network, of image harmonizer 206, is iteratively trained using multiple training input composite image/mask pairs to generate training harmonized images. In each iteration, image harmonizer 206 can select a training composite image/mask pair and associated reference information. Reference information can include a reference image and/or reference semantic information, such as scene parsing pixel information. Image harmonizer 206 uses an image harmonizing neural network to generate a training harmonized image from the input training image/mask pair. The training harmonized image can then be compared to the reference image to compute any errors. Such errors can then be fed back through the image harmonizing neural network to teach the network to reduce such errors in future iterations.

For cloud-based implementations, the instructions on server 208 may implement one or more components of image harmonizer 206, and application 210 may be utilized by a user to interface with the functionality implemented on server(s) 208. In some cases, application 210 comprises a web browser. In other cases, server 208 may not be required. For example, the components of image harmonizer 206 may be implemented completely on a user device, such as user device 202a. In this case, image harmonizer 206 may be embodied at least partially by the instructions corresponding to application 210.

Thus, it should be appreciated that image harmonizer 206 may be provided via multiple devices arranged in a distributed environment that collectively provide the functionality described herein. Additionally, other components not shown may also be included within the distributed environment. In addition, or instead, image harmonizer 206 can be integrated, at least partially, into a user device, such as user device 202a. Furthermore, image harmonizer 206 may at least partially be embodied as a cloud computing service.

Figure 3:
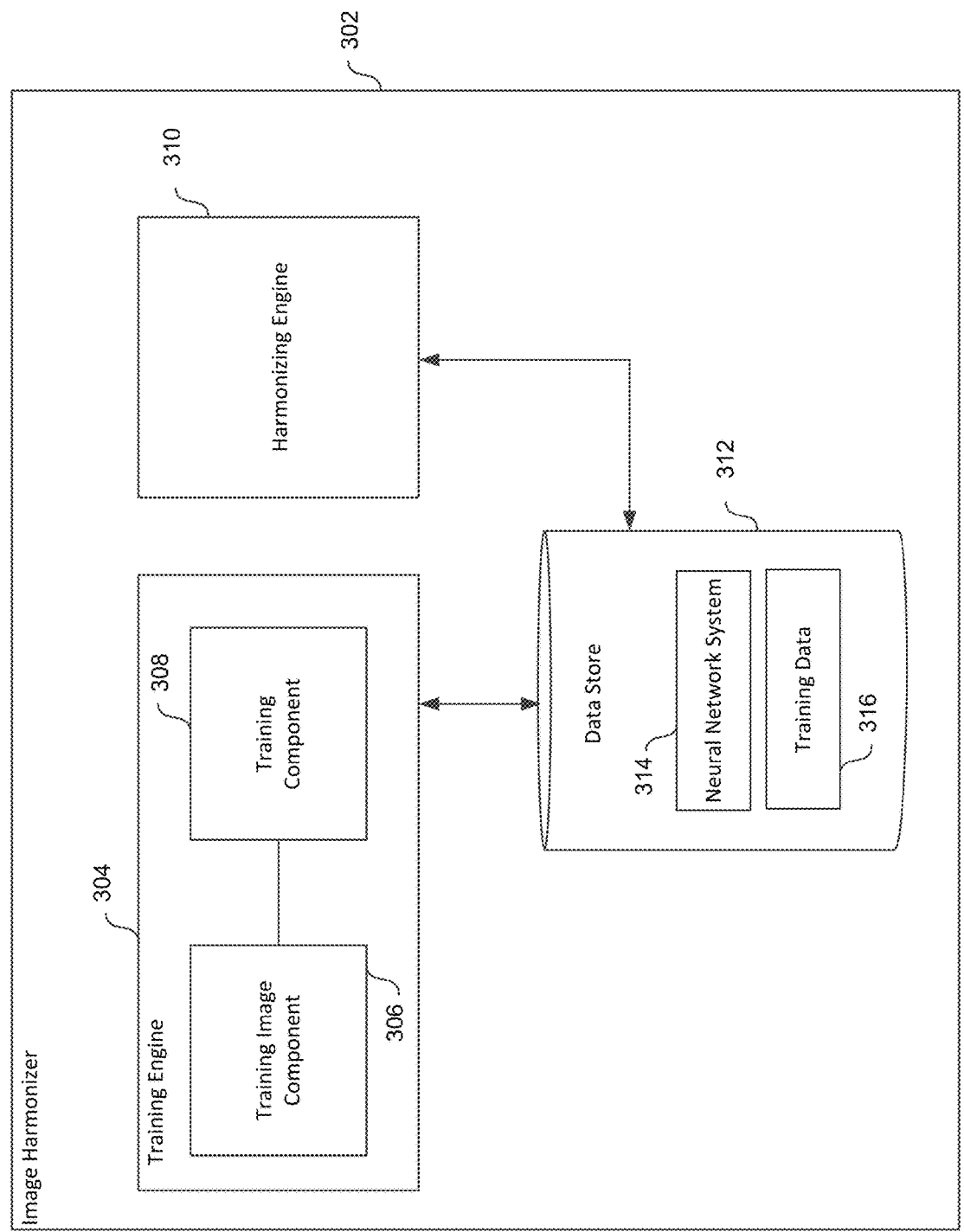
FIG. 3 depicts aspects of an illustrative composite image harmonizing system, in accordance with various embodiments of the present disclosure.

Referring to FIG. 3, aspects of an illustrative image harmonizing system are shown, in accordance with various embodiments of the present disclosure. Image harmonizer 302 includes training engine 304, harmonizing engine 310, and data store 312. The foregoing components of image harmonizer 302 can be implemented, for example, in operating environment 200 of FIG. 2. In particular, those components may be integrated into any suitable combination of user devices 202a and 202b through 202n, and server(s) 208.

Data store 312 can store computer instructions (e.g., software program instructions, routines, or services), data, and/or models used in embodiments described herein. In some implementations, data store 312 stores information or data received via the various components of image harmonizer 302 and provides the various components with access to that information or data, as needed. Although depicted as a single component, data store 312 may be embodied as one or more data stores. Further, the information in data store 312 may be distributed in any suitable manner across one or more data stores for storage (which may be hosted externally).

In embodiments, data stored in data store 312 includes training data 316. Training data generally refers to data used to train a neural network, or portion thereof. As such, training data 316 can include reference images, training composite images, training masks, and/or training harmonized images. In some cases, image harmonizer 302 can receive data from user devices (e.g., an input composite image/mask received by user device 202a or another device associated with a user, via, for example, application 210). In other cases, data can be received from one or more data stores in the cloud.

Data store 312 can also be used to store neural network system 314. Such a neural network system can be comprised of one or more neural networks, such as an image harmonizing neural network.

Training engine 304 can be used to train neural network system 314. Such a neural network system can be used to harmonize composite images. As depicted in FIG. 3, training engine 304 includes a training image component 306 and a training component 308. Although a training image component and training component are illustrated separately, as can be appreciated, the functionality described in association therewith can be performed by any number of components.

Training image component 306 can generate training images by creating synthesized composite images. Such synthesized composite images can be created utilizing various methods. In one method, images with associated object segmentation masks can be used to create synthesized composite images. This can be accomplished by randomly selecting an object or region of an image and editing its appearances via a color transfer method. Using color transfer methods ensures that the changes to the color and/or tone of the synthesized composite image are neither arbitrary nor unrealistic. Color transfer involves using an image which contains a similar object or region with the same semantics as the image being used to generate the synthesized composite image. Such an object or region can be referred to as a reference object or a reference region. The coloration from the reference object and/or region can be transferred to the selected region in the image to generate a synthesized composite image. This ensures that the edited image maintains plausible coloration/tone for the altered object or region but that the coloration/tone is different from the original background. To further increase the dataset, different transfer parameters can be applied for both luminance and color temperature on one image.

In another method, synthesized composite images can be created utilizing a group of images where each image has a number of different versions (e.g. five different versions). These versions each have distinct coloration and/or tone from the editing process of the image. A region or object in an image can be randomly selected and segmented. Segmentation can be performed using, for example, Photoshop®. Upon segmentation, the object or region can be composited with a different version of the image to create a synthesized composite image that has a foreground region/object with different coloration/tone than the background region.

In a further method, to increase the diversity of images, training image component 306 can generate training images that include a vast array of scenes, styles, and subject matters to ensure that the neural network system is capable upon completion of its training of recognizing a wide variety of colors, patterns, structures of subjects, and/or relationships between objects depicted in input images. A pre-trained scene-parsing model can be used to predict semantic pixel-wise labels for each image. Semantic pixel-wise labels define information about various regions in an image, for example, that one portion of an image is grass, another portion is sky, and still another portion is a blanket. Such information can be used to retrieve images with similar regions that can be used as reference objects or regions. Then, as described above, an object and/or region of the image can be segmented and modified using the coloration and/or tone from the reference object or region with shared labels as the target object and/or region.

Training component 308 can select training composite images for training a neural network system, for example, to train an image harmonizing neural network within such a system. Such training images can be generated, for example, using training image component 306 as described above. Alternatively, such a training image can be selected, for example, from training data 316 on data store 312. In addition to selecting a training image, training component 308 can select a mask that corresponds to the foreground region of the training image. The mask can be a binary mask indicating the pixels of the training image that are pure foreground and pure background. In other embodiments, the mask can also include pixels with both foreground and background information. In further embodiments, an inverse mask can be generated and used that corresponds to the background region of the training image. The image harmonizing neural network can output a harmonized image from the training input composite image/mask.

In execution, a neural network system, trained according to the present disclosure, can be used to harmonize composite images input into an image harmonizing neural network of such a system. Image harmonization can be performed using harmonizing engine 310. As can be appreciated, a trained neural network system, such as a trained image harmonization network, can be used by the harmonizing engine to generate harmonized images for input composite images. The method of generating harmonized images can be similar to the process described for training the neural network system, however in execution, input images are typically not synthesized composite images as training input composite images were during training.

In embodiments, harmonizing engine 310 can be used to run a trained neural network system to generate a harmonized image for an input composite image. A composite image can be received from a user at a user device. In particular, a user can select or input an image or picture from which a foreground region is to be extracted and composited with a new background region to create an input composite image. A foreground image and/or picture can be selected or input in any manner. For example, a user may take a picture using a camera on a device, for example, user device 202a of FIG. 2. As another example, a user may select a desired image from a repository, for example, stored in a data store accessible by a network or stored locally at the user device 202a of FIG. 2. In other embodiments, a user can input the image by inputting a link or URL to an image. Alternatively, a user may select a desired composite image from a repository, for example, stored in a data store accessible by a network or stored locally at the user device 202a of FIG. 2 and/or a user can select a composite image from a group of images stored in a database, such as data store 312 of FIG. 3. In addition to the input image, an associated mask can be input. Such a mask can be input by a user or utilizing an algorithm without user interaction. Based on the input composite image and, in some embodiments, an associated mask, a harmonized image can be generated for an input composite image by the harmonizing engine.

After the neural network system generates a harmonized image based on an input composite image and, in some embodiments, an associated mask, matting engine 310 can provide the harmonized image to a user via a user device, for example, user device 202a.

Figure 4:
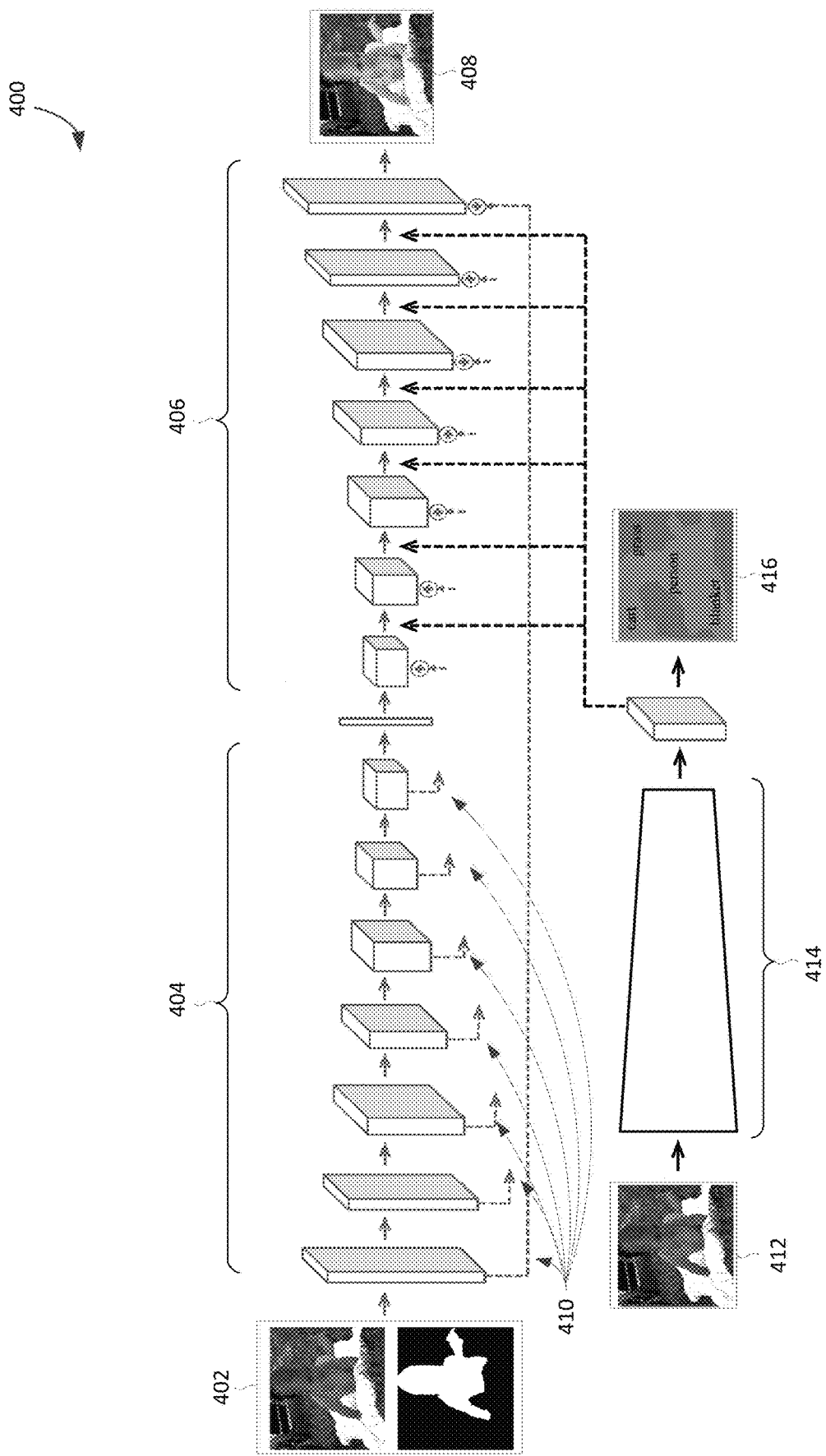
FIG. 4 provides an illustrative neural network for generating a harmonized composite image from a composite image, in accordance with embodiments of the present disclosure.

FIG. 4 shows a schematic of one possible embodiment of neural network 400. Neural network 400 may be implemented in an image harmonizing system, for example, image harmonizer 206 as described with reference to FIG. 2 and/or image harmonizer 302 as described with reference to FIG. 3. Neural network 400 can receive input image 402 and generate output image 408. Input image 402 can include a composite image and a mask of the foreground object/region in the composite image. It should be appreciated that in some embodiments, input image 402 need not include such a mask and may derive such a mask from an input composite image. During the training of the neural network, input image 402 can include a training input composite image and output image 408 can be a training harmonized image.

As depicted, neural network 400 comprises encoder 404 and decoder 406. Such an encoder can be used to learn feature representations that capture image context, while the decoder can be used to reconstruct an output image and adjust the composite region using learned representations. Encoder 404 is comprised of convolutional layers that encode the content, or feature vectors, of the input image into a low dimensional space, for example, a 10×24 dimension. Decoder 406 is comprised of deconvolutional layers that recover the image from the low dimensional space and generate a harmonized image.

Incorporating a mask as an input adds an additional channel in the input of the system, resulting in a four-channel input, allows the network to better know where to adjust the appearance in the input composite images. A four-channel input can occur due to an input composite image being represented as a RGB image, contributing three channels, plus an input mask, contributing one channel. Such a binary mask input can train the network which region(s) to modify as indicated by the mask. As such, the network learns to identify what portion(s) of the input image need to be changed based on an input mask.

Additionally, skip layers 410 can be added to the network, linking layers of the encoder to the corresponding layers in the decoder so that learned representation of an input image can be directly propagated to the decoder from the encoder during reconstruction of the output image. Using such an architecture feature allows the network to retain image details and textures that may otherwise be lost during the compression process in the encoder. Skip layers are effective in maintaining such features without adding additional burdens for training the network. In addition, skip layers can alleviate the problem of reconstruction loss, discussed further below, that can prefer a blurry image solution. As such, the neural network can output harmonized images by adjusting the appearance of the foreground region to match the context of the background region of the input composite image.

To ensure the adjusted foreground region maintains a realistic appearance, semantic information about the input image can be employed. In the depicted embodiment, to add semantic information during network training, pre-trained scene parsing network 414 can be used to generate pixel-wise semantic labels 416 of input image 412. Pixel-wise semantic labels 416 can be resized and concatenated to each layer in the decoder so that semantic feature representations are added when reconstructing output image 408. Adding such semantic information ensures that color and/or tone modifications to the foreground region of the input composite image remain realistic; for example, grass should be green/yellow and not a blue color. As depicted, in embodiments, these responses are not added to the last layer of the decoder so that this final layer only focuses on reconstructing the final output harmonized image.

The neural network can then be trained by evaluating different types of loss to determine any errors or discrepancies therebetween, as described in more detail below. Errors can include inaccuracies, flaws, variations, and/or divergences between the training output harmonized image and the desired output, often referred to as the ground-truth or output if the network was perfectly trained. This desired output is reflected in a reference image used for comparison with the training output harmonized image. Such errors can be determined by comparing parameters of the training output and the ground-truth to find a loss function. In some embodiments, updating the neural network involves feeding errors back through the neural network so the algorithm can adjust network connections in order to reduce the value of the error.

Adjusting the neural network to correct for errors is accomplished by changing at least one node parameter of such a neural network. The neural network can comprise a plurality of interconnected nodes with a parameter, or weight, associate with each node. Each node receives inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation. Errors can be determined, for example, using loss functions, such as reconstruction loss, or the like. Errors determined using loss functions are used to minimize loss in the neural network by backwards propagation of such errors through the network.

In embodiments, errors can be determined by evaluating reconstruction loss. Reconstruction loss can be determined by calculating the differences between the ground-truth RGB colors in a reference image and the predicted RGB colors of a harmonized image. The two images can be compared at each pixel to determine any differences.

In such a system, the input composite image can be represented as a RGB image: $I \in \mathbb{R}^{H \times W \times 3}$. The input binary mask can be represented as $M \in \mathbb{R}^{H \times W \times 1}$. Thus, together, such inputs form the input $X \in \mathbb{R}^{H \times W \times 4}$ by D concatenating I and M, where H and W are image dimensions, thus, such a network has four input channels. An example equation for approximating such reconstruction loss is $\mathcal{L}_{rec}(X) = \frac{1}{2} \Sigma_{h,w} \|Y_{h,w} - \hat{Y}_{h,w}\|_2^2$; where Y denotes the ground truth harmonized image, $\hat{Y}$ denotes the output image where $\hat{Y} = \mathcal{F}(X)$. Reconstruction loss can constrain the network to follow the compositional operation, which can leads to more accurate harmonized images.

Figure 5:
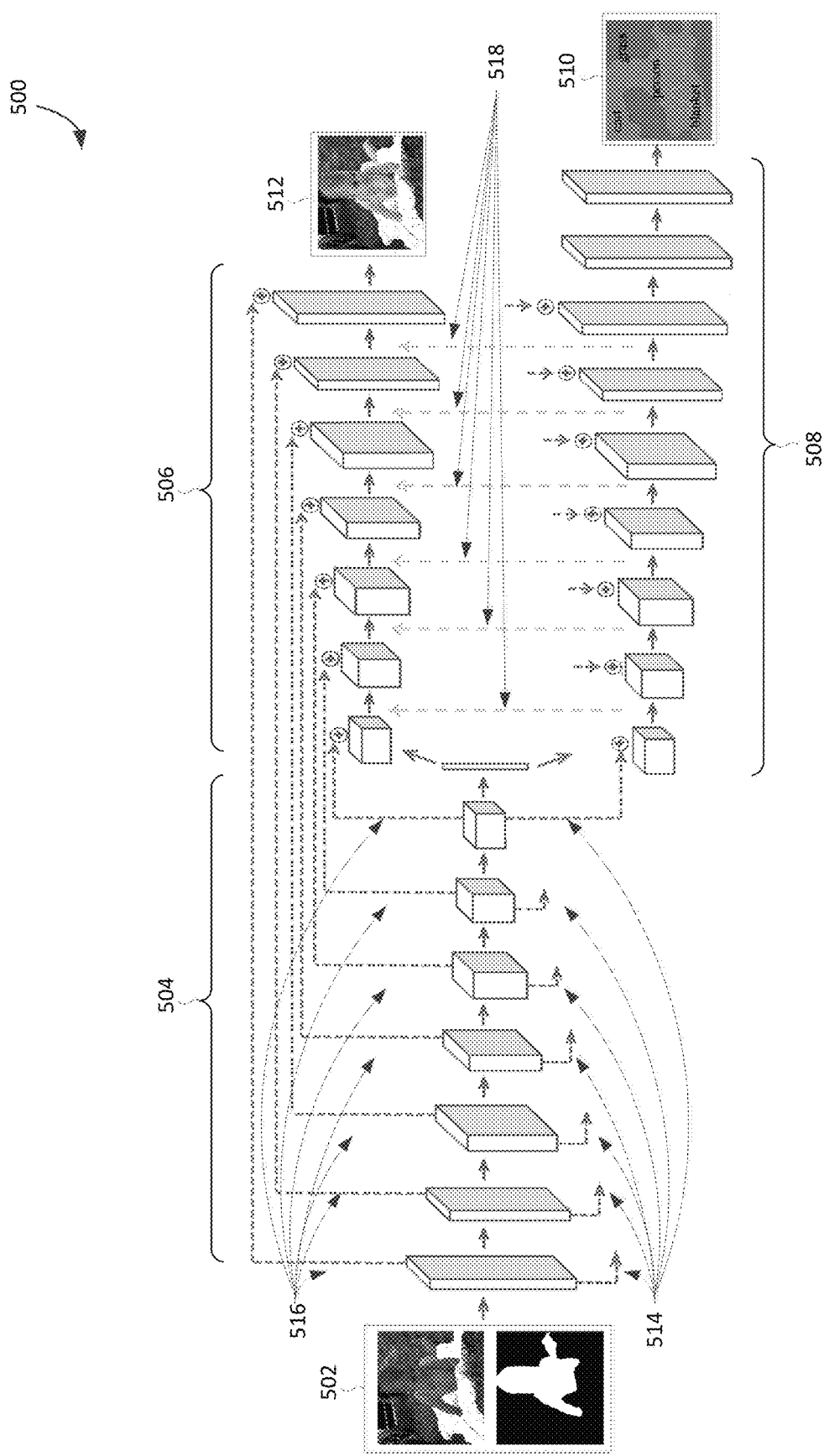
FIG. 5 provides an illustrative neural network for generating a harmonized composite image from a composite image, in accordance with embodiments of the present disclosure

FIG. 5 shows a schematic of another embodiment of neural network 500 including two decoders with a shared encoder that undergo joint training. Neural network 500 may be implemented into an image harmonizing system, for example, image harmonizer 206 as described with reference to FIG. 2 and/or image harmonizer 302 as described with reference to FIG. 3. Neural network 500 can receive input image 502, determine pixel-wise semantic labels 510, and generate output image 512. Input image 502 can include a composite image and/or a mask of the foreground object in the composite image. It should be appreciated that in some embodiments, input image 502 need not include a mask. During the training of the neural network, input image 502 can include a training input composite image and output image 512 can be a training harmonized image. Neural network 500 also adds pixel-wise semantic labels 510 that can be training pixel-wise semantic labels for the input image. As depicted, neural network 500 comprises encoder 504, harmonization decoder 506, and scene parsing decoder 508. In such a system, the encoder can be used to learn feature representations that capture image contexts. With two decoders in such a system, the harmonization decoder can be used to reconstruct an output image and adjust the composite region using learned representations and the scene parsing decoder can be used to determine feature maps for concatenation with the layers of the harmonization decoder.

Incorporating a mask as an input image adds an additional channel in the input so the network knows better where to adjust the appearance in the input composite images. Additionally, skip layers 514 and 516 can be added between layers of the encoder to the corresponding layer in the harmonization decoder and scene parsing decoder so that learned representation of an input image can be directly propagated to the decoders during reconstruction of the output image. Using such an architecture feature allows the network to retain image details and textures that may otherwise be lost during the compression process in the encoder. As such, the neural network can output harmonized images by adjusting the appearance of the foreground region to match the context of the background region of the input composite image.

Incorporating the scene parsing decoder into the neural network ensures the adjusted foreground region maintains a realistic appearance by employing semantic information about the region. In the depicted embodiment, to add semantic knowledge during network training, a scene parsing decoder can be used to generate pixel-wise semantic labels 510 for input image 502. The pixel-wise semantic labels can be concatenated to each layer in the harmonization decoder, as shown by 518, so that semantic feature representations are added as priors when reconstructing output image 512. Adding such semantic information ensures that the network learns what color and/or tone modifications to the foreground region of the input composite image are realistic, for example, learning that grass is green/yellow and not blue, whereas sky is blue/grey or red/yellow, not green. As depicted, these responses are not added to the last layer of the decoder so that this final layer only focuses on reconstructing the final output harmonized image.

The neural network can then be trained by evaluating different types of loss to determine any errors or discrepancies therebetween, as described in more detail below. Errors can include inaccuracies, flaws, variations, and/or divergences between the training output harmonized image and the desired output, often referred to as the ground-truth or output if the network was perfectly trained. Such errors can be determined by comparing parameters of the training output and the ground-truth to find a loss function. In some embodiments, updating the neural network involves feeding errors back through the neural network so the algorithm can adjust network connections in order to reduce the value of the error.

Adjusting the neural network to correct for errors can be accomplished as previously described above. For example, in embodiments, errors can be determined by evaluating reconstruction loss. Reconstruction loss can be determined by calculating the differences between the ground-truth RGB colors in a reference image and the predicted RGB colors of a harmonized image. The two images can be compared at each pixel to determine any differences. In addition to reconstruction loss, pixel-wise cross-entropy loss can be used to minimize loss in the neural network by backwards propagation of such errors through the network. Pixel-wise cross-entropy loss can be analyzed by comparing the differences between semantic labels for pixels of a reference-parsed scene and the corresponding pixels of the training-parsed scene. An example equation that can be utilized for determining pixel-wise cross-entropy loss is $\mathcal{L}_{cro}(X) = -\Sigma_{h,w} \log(\mathbb{E}(X_{h,w};\theta))$. Reconstruction loss and pixel-wise cross-entropy loss can be combined to determine loss for both tasks and optimize as, for example, $\mathcal{L}_{rec}(X) = \lambda_1 \mathcal{L}_{rec} + \lambda_2 \mathcal{L}_{cro}$; where $\lambda_i$ is the weight to control the balance between losses for image harmonization and scene parsing.

To enable such training, a reference image and reference pixel-wise semantic labels can be used for ground-truth comparisons with the information output by the neural network. For instance, a dataset can be used that contains training images with semantic labels. To train such a network, training data can be input to obtain outputs related to scene parsing by the network by setting $\lambda_1=1$ and $\lambda_2=100$ with a fixed learning rate of $10^{-8}$. Fine-tuning the network can be accomplished by setting $\lambda_2=0$ using additional training data for image harmonization. During such fine-tuning, the scene parsing decoder can propagate learned semantic information to the harmonizing decoder. As such, the network can learn color distribution for certain semantic categories, for example, the skin color on human or sky-like colors. Learning background semantics can also help to identify which regions to match to better adjust the foreground region during harmonization.

Figure 6:
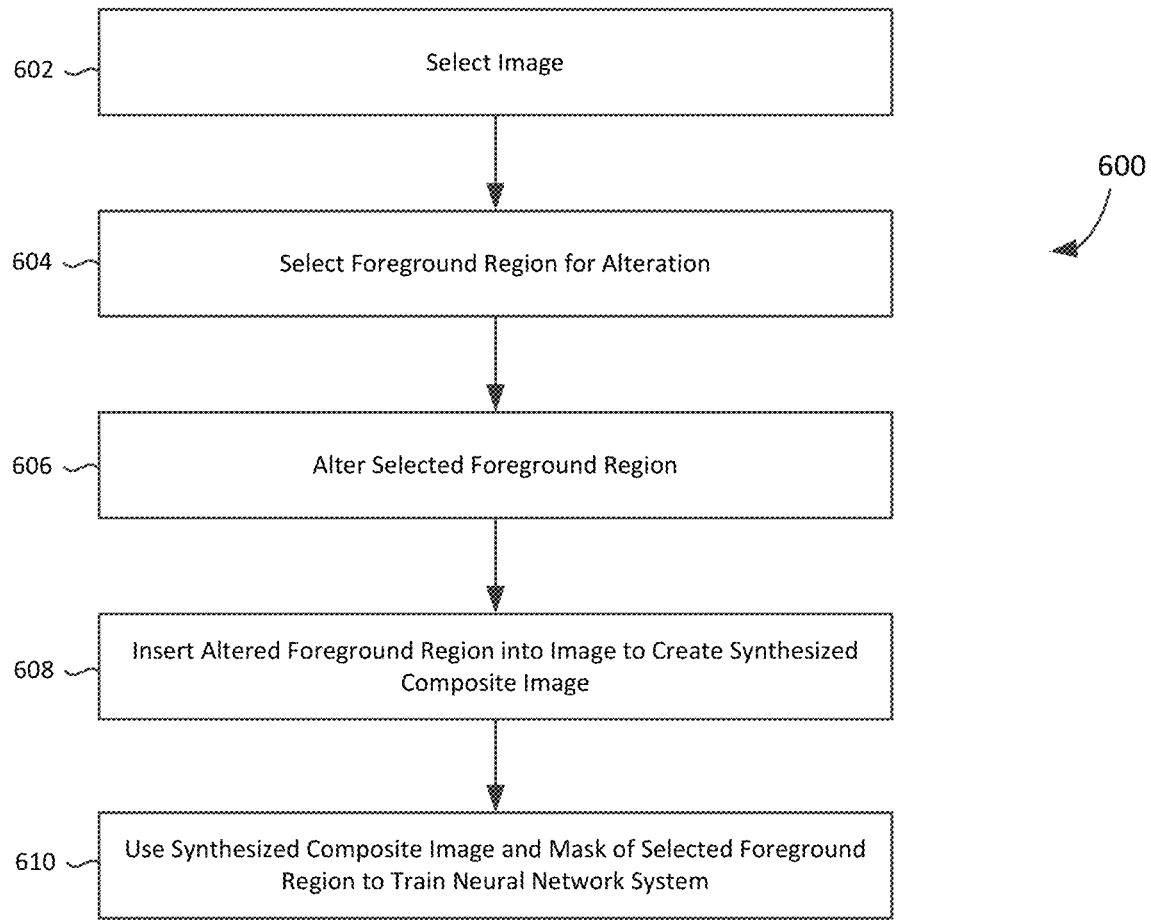
FIG. 6 illustrates a process flow showing an embodiment for synthesizing composite images for training a neural network system to harmonize composite images, in accordance with embodiments of the present invention.

With reference to FIG. 6, a process flow is provided showing an embodiment of method 600 for generating training composite images for training a neural network system to generate harmonized composite images, in accordance with embodiments of the present invention. Method 600 can be performed, for example, by training image component 306 of image harmonizer 302, as illustrated in FIG. 3.

At block 602, an image can be selected to modify for use in training a neural network system for harmonizing composite images. An image can be selected from a group of images stored in a database, such as data store 312 of FIG. 3 and/or from an image database stored in the cloud. Such an image can consist of one or more foreground objects and/or regions and a background region, for example, people sitting around a table in a living room or a mountain landscape.

At block 604, one or more of the foreground regions in the image can be selected for alteration. Such selections can be made randomly to create a more robustly trained neural network that recognizes a large range of types of foreground regions and/or objects. One way for selecting such a foreground region can be using editing features in Photoshop®.

Once the foreground region is selected, at block 606, the foreground region can be altered. Several methods can be used to perform this process. In one method, images with associated object segmentation masks can be used to create synthesized composite images. This can be accomplished by randomly selecting an object or region of an image and editing its appearances via a color transfer method. Such color transfer methods ensure that the synthesized composite image is neither arbitrary nor unrealistic in color or tone. An image can be used which contains a reference object and/or region with the same or similar semantics. The coloration from the reference object and/or region can be transferred to the selected region. This ensures that the edited image is plausible but different from the original background. To further increase the dataset, different transfer parameters can be applied for both luminance and color temperature on one image. In another method, a group of images where each image has five different styles can be used to create synthesized composite images. A region or object in an image can be randomly selected and segmented. Such segmentation can be performed using, for example, Photoshop®. Upon segmentation, the object or region can be composited with a different style of the image to create a synthesized composite image. In a further method, to increase the diversity of images, training image component 306 can generates training images that include a vast array of scenes, styles, and subject matters to ensure that the neural network system is capable upon completion of its training of recognizing a wide variety of colors, patterns, structures of subjects, and/or relationships between objects depicted in input images. A pre-trained scene-parsing model can be used to predict semantic pixel-wise labels for each image. Such information can be used to retrieve reference images with similar histograms. Then, as described above, an object and/or region of the image can be segmented and modified using coloration from the reference object with shared labels as the target object and/or region.

At block 608, a synthesized composite image can be created by compositing the altered foreground region, for example, the region altered at block 606, onto the unmodified background region of the selected image, for example, the image selected at block 602. At block 610, synthesized composite images, such as those created at block 608, can be used to train a neural network system. The neural network system can be comprised of an image harmonizing neural network. In addition, a mask of the selected foreground region, such as the foreground region selected at block 606, can be used to train the neural network system. Composite image/mask pairs can be input into the neural network system to generate harmonized images. These training harmonized images can be compared to reference images, such as the original image selected at block 602. This comparison can be used to determine errors in the neural network system that can be corrected to train a more accurate system.

Figure 7:
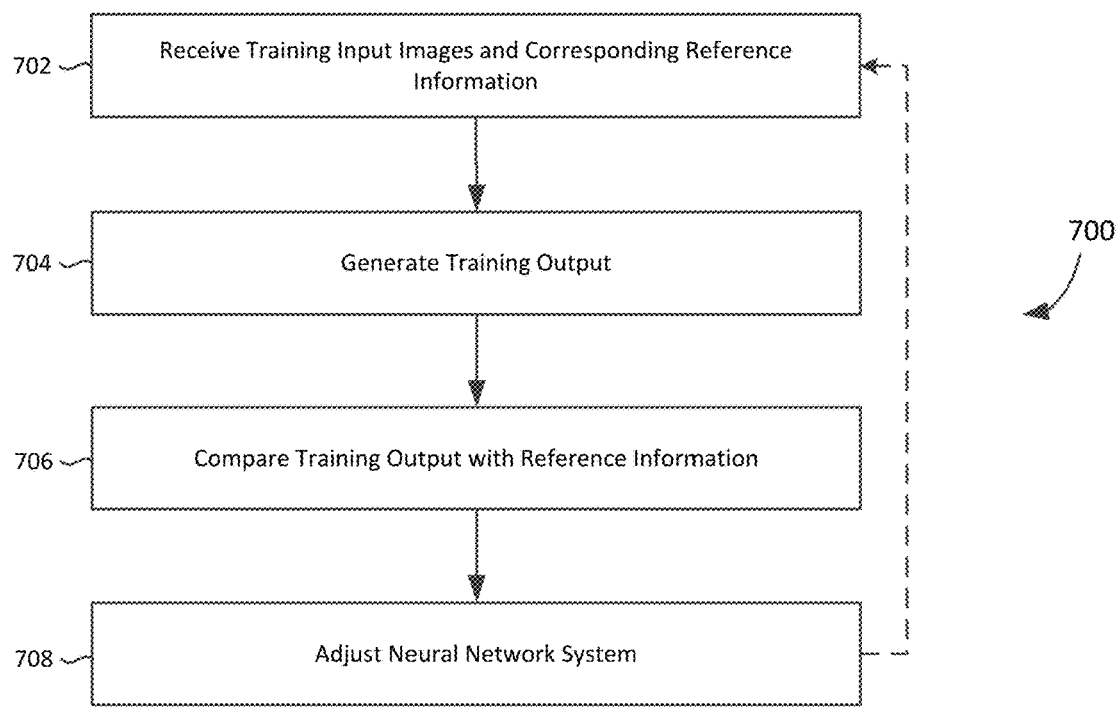
FIG. 7 illustrates an example method for training a neural network system to generate harmonized images from input composite images, in accordance with embodiments of the present invention.

FIG. 7 illustrates an example method 700 for training a neural network system to harmonized composite images, in accordance with embodiments of the present invention. The neural network system used in method 700 can be comprised of one or more neural networks, for example, an image harmonizing neural network that performs blocks 702 through 708.

At block 702, training data can be received including: training images, for example, a training composite image and, in some embodiments, training masks, for example, of a foreground region of the training composite image, and reference information, for example, reference harmonized images and/or scene parsing pixel information. Such training data can be received from, for example, training data 316 stored on data store 312 of FIG. 3 and/or from an image database stored in the cloud.

At block 704, a training output can be generated by the neural network system for the received training input information. This can be accomplished using a neural network system, specifically, using a neural network of the system such as an image harmonizing neural network. At block 706, the training harmonized image can be compared with a reference image associated with the training composite image. This comparison can include determining composition loss and/or pixel-wise cross-entropy loss.

These comparisons can be used at block 708 where the neural network system can be adjusted using the determined loss functions. Errors determined using loss functions can be used to minimize loss in the neural network system by backwards propagation of such errors through the system. As indicated in FIG. 7, the foregoing blocks may be repeated any number of times to train the neural network system (e.g., using different training images and corresponding reference information for each iteration).

Figure 8:
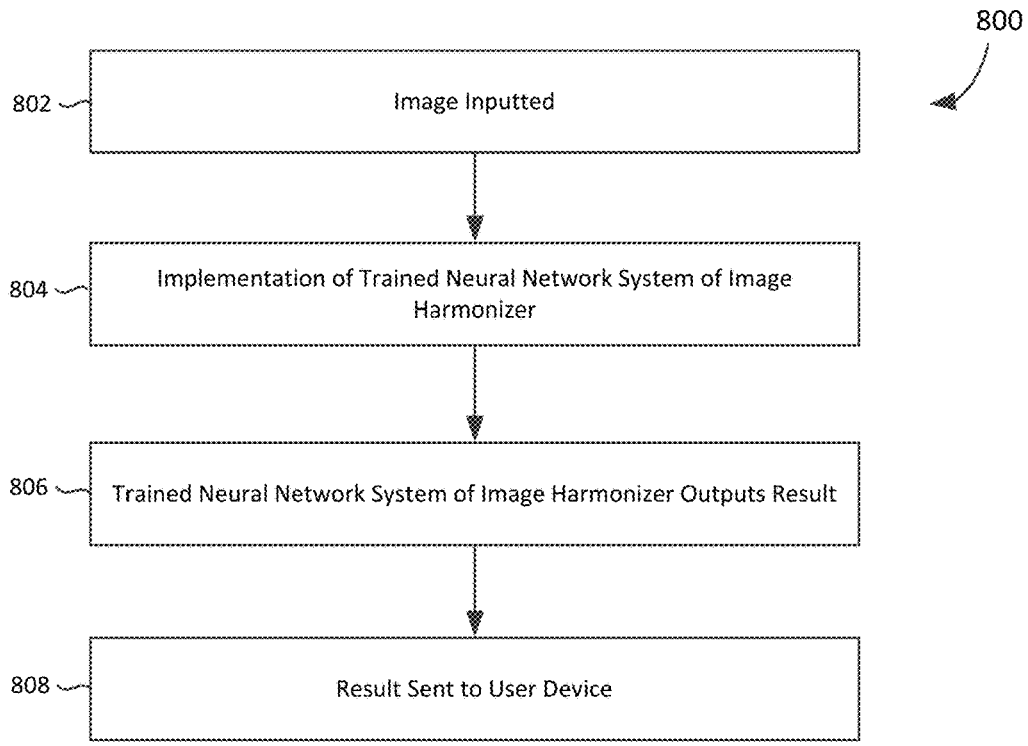
FIG. 8 illustrates an example method for generating harmonized images from input composite images using a trained neural network, in accordance with embodiments of the present invention.

FIG. 8 illustrates an example method 800 for generating harmonized images from input composite images, in accordance with embodiments of the present invention. Method 800 can be performed, for example by image harmonizer 206 of FIG. 2 and/or image harmonizer 302 utilizing neural network system 314 of FIG. 3 upon completion of training the system. It should be appreciated that such a trained neural network system can generate harmonized composite images from an input foreground object(s) and background using the neural network without requiring any additional user intervention.

At block 802, an image can be input. For example, a user can input a composite image into an image harmonizer, for example, image harmonizer 206 as described with reference to FIG. 2 and/or image harmonizer 302 as described with reference to FIG. 3. A user can select such a composite image from a group of images stored in a database, such as data store 312 of FIG. 3. Alternatively, an image can be input from which a foreground object can be extracted and composited with a new background. This can be performed using, for example, Photoshop®, a mobile application, and/or a camera application. In this case, the image can be input using a camera to take a picture or a user can input the image by inputting a link or URL to an image. Still further, a previously extracted foreground object and a selected new background can be separately input into such an image harmonizer.

Additionally, at block 802, a mask of the foreground object can be input. The mask can be a binary mask that indicates the pixels of the training image that are foreground the pixels that are background. In embodiments, the mask of the foreground object can be generated by the system without intervention by the user. In further embodiments, an inverse mask can be generated by the system and used, where the inverse that corresponds to the background region of the composite image. A user can also directly input a mask. Alternatively, a user can create the mask using binary selection to select the foreground/background for the input image. Such a binary selection can be made, for example, using Photoshop®. In addition, an algorithm can be used to create a mask. Using such an algorithm could allow a mask to be generated from an input image without user intervention and/or interaction.

At block 804, the trained neural network system can be implemented to generate a harmonized image for an input composite image. The neural network system can have previously been trained in a manner as described in reference to method 700 in FIG. 7. As such, the neural network system can be comprised of an image harmonizing neural network. Upon conclusion of the training process, the trained image harmonizing neural network can be used to generate harmonized images. This trained neural network system can be used to generate harmonized images for input composite images without requiring user interaction beyond the inputting of a foreground object, or an image from which a foreground object is to be extracted, and a new background.

At block 806, the neural network system outputs a result. Such a result can be a harmonized image. At block 808, the result output by the neural network system can be sent to a user device. A user device can be a user device such as user device 202*a* through 202*n* as depicted in FIG. 2. In embodiments, this output can be manipulated and/or interacted with by the user, for example, by harmonizing the image to the background region instead of the foreground region, or vice versa. Interaction with the harmonized image can occur using a touch screen, a stylus, a mouse, and/or a track pad.

Figure 9:
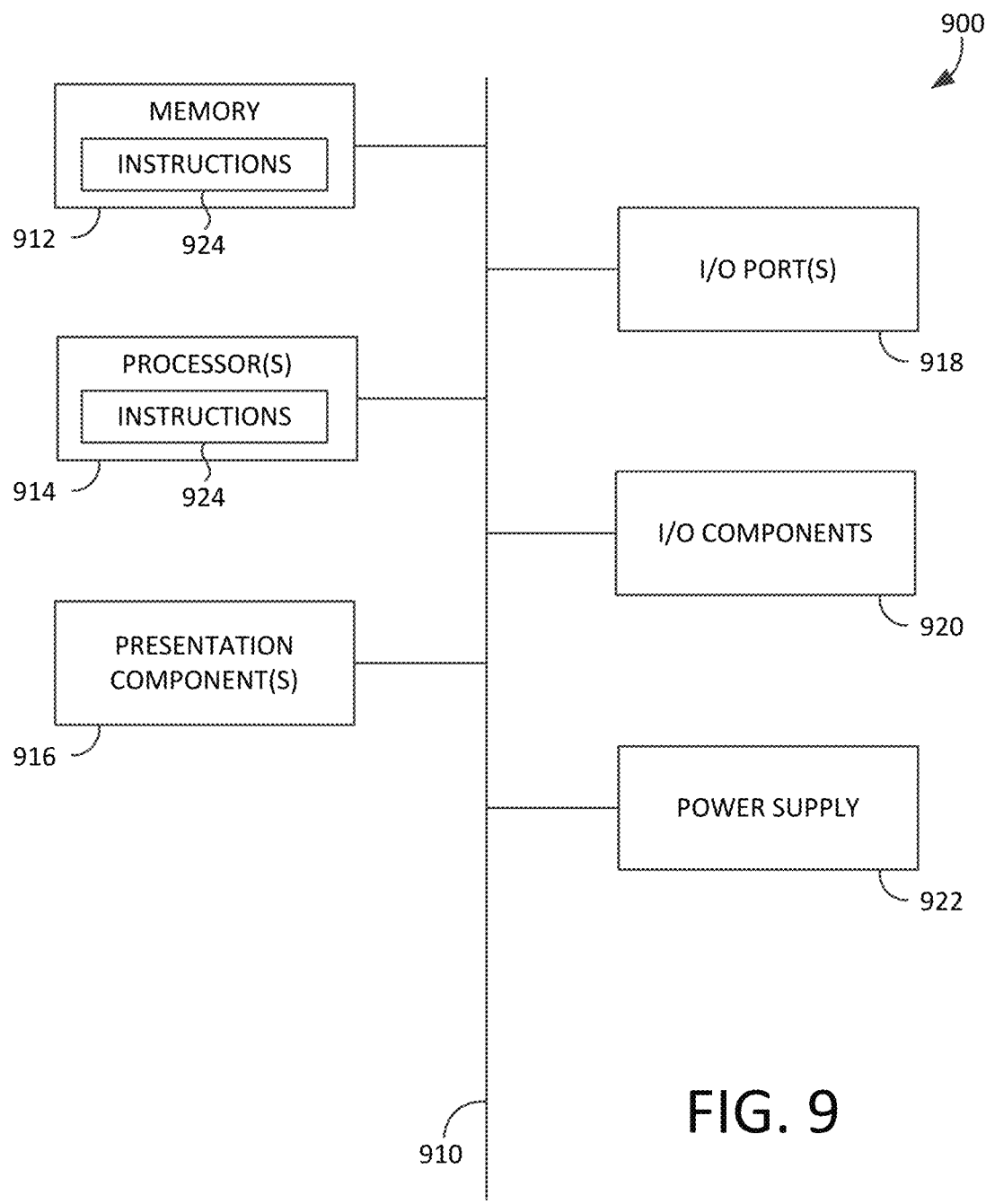
FIG. 9 is a block diagram of an example computing device in which embodiments of the present disclosure may be employed.

Having described embodiments of the present invention, FIG. 9 provides an example of a computing device in which embodiments of the present invention may be employed. Computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present invention. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for training a neural network system to harmonize composite images, the method comprising:
   receiving, by a neural network, a training composite image wherein the training composite image comprises a reference image with a modified region;
   generating, via the neural network, a training harmonized image from the training composite image received by the neural network, wherein, to generate the training harmonized image, the neural network changes coloration of the modified region of the training composite image to harmonize the modified region with the training composite image; and
   training the neural network based on a comparison of the generated training harmonized image and the reference image.

2. The computer-implemented method of claim 1, further comprising:
   receiving a mask of the training composite image, wherein the neural network is trained to modify a foreground region as indicated by the mask.

3. The computer-implemented method of claim 1, further comprising:
   receiving the reference image; and
   modifying the reference image, wherein the modification includes editing a selected region of the reference image to generate the training composite image.

4. The computer-implemented method of claim 3, wherein the selected region of the reference image is edited by modifying the selected region to a different coloration from a coloration of the reference image.

5. The computer-implemented method of claim 4, wherein the selected region is modified to the different coloration using color transfer from a reference region of another image, wherein the reference region contains an object with semantic information within a measure of similarity of semantic information of an object contained in the selected region.

6. The computer-implemented method of claim 1, further comprising:
   adjusting the neural network based on a loss function, wherein the loss function is based on determining reconstruction loss by comparing the reference image and the training harmonized image.

7. The computer-implemented method of claim 6, wherein the loss function is further based on determining pixel-wise cross-entropy loss by comparing pixel semantic labels of the training harmonized image and reference pixel semantic labels.

8. A computer-storage medium having a plurality of executable instructions embodied thereon, which, when executed by one or more processors, cause the one or more processors to perform a method for generating a harmonized image for an input composite image, the method comprising:
   receiving a composite image comprising a foreground region and a background region; and
   generating a harmonized image using a neural network of a neural network system, the neural network configured to harmonize coloration of the foreground region and coloration of the background region by modifying the coloration of the foreground region to match the coloration of the background region.

9. The medium of claim 8, the method further comprising:
   generating the composite image by compositing the foreground region with the background region.

10. The medium of claim 8, the method further comprising:
    receiving an input image;
    selecting a region of the input image to extract; and
    extracting the region as the foreground region; and
    generating the composite image by compositing the foreground region with the background region.

11. The medium of claim 10, the method further comprising:
    receiving, by the neural network system, an input mask of the foreground region, indicating for the neural network to harmonize to the coloration of the foreground region.

12. The medium of claim 11, the method further comprising:
    generating, by the neural network system, a reverse mask of the input mask, the reverse mask indicating for the neural network to harmonize to the coloration of a background region.

13. The medium of claim 8, wherein the neural network comprises a trained neural network, wherein the trained neural network is based on a comparison of a training harmonized image and a reference image with a modified region to generate a training input image, wherein the trained neural network generates the training harmonized image from the training input composite image.

14. The medium of claim 13, the trained neural network further based on: generating the training harmonized image from the training input composite image; and
    adjusting parameters based on a loss function.

15. The medium of claim 14, wherein the loss function includes determining reconstruction loss from a comparison of the reference image and the training harmonized image.

* * * * *